United States Patent
Tabata

(10) Patent No.: US 9,610,875 B2
(45) Date of Patent: Apr. 4, 2017

(54) TRIM COVER ASSEMBLY AND SEWING METHOD FOR FORMING SAME

(71) Applicant: Tsuyoshi Tabata, Tokyo (JP)

(72) Inventor: Tsuyoshi Tabata, Tokyo (JP)

(73) Assignee: TACHI-S CO., LTD. (JP)

( * ) Notice: Subject to any disclaimer, the term of this patent is extended or adjusted under 35 U.S.C. 154(b) by 447 days.

(21) Appl. No.: 13/969,943

(22) Filed: Aug. 19, 2013

(65) Prior Publication Data

US 2014/0062162 A1    Mar. 6, 2014

(30) Foreign Application Priority Data

Aug. 30, 2012   (JP) ................................ 2012-189386

(51) Int. Cl.
*A47C 7/02*     (2006.01)
*B60N 2/58*     (2006.01)
(Continued)

(52) U.S. Cl.
CPC .............. *B60N 2/5883* (2013.01); *B60N 2/48* (2013.01); *B60N 2/5891* (2013.01); *B60N 2/70* (2013.01);
(Continued)

(58) Field of Classification Search
CPC ........ A47C 7/40; A47C 7/386; B60N 2/5825; B60N 2/4808
(Continued)

(56) References Cited

U.S. PATENT DOCUMENTS 3,788,701 A * 1/1974 Massaccesi ................ 297/452.2
3,797,887 A * 3/1974 Barecki et al. ........... 297/452.19
(Continued)

FOREIGN PATENT DOCUMENTS

DE    202010009427 U1   10/2010
EP         1535795 A1    6/2005
(Continued)

OTHER PUBLICATIONS

European Search Report, dated Nov. 19, 2013, issued in corresponding European Application No. EP13182114.2. Total 7 pages.

*Primary Examiner* — David R Dunn
*Assistant Examiner* — Alexander Harrison
(74) *Attorney, Agent, or Firm* — Ostrolenk Faber LLP

(57) ABSTRACT

A trim cover assembly of extremely soft property comprises a surface cover element, a wadding cover, and a thick foam wadding sandwiched therebetween, wherein the thick foam wadding has a compressed thin end surface region sewn with the surface cover element and wadding cover. Sewing method for forming such trim cover assembly involves: pressing and collapsing an end surface of the thick foam wadding in downwardly slantwise direction to provide a compressed thin area, thereby allowing direct access thereto of a conventional sewing machine; operating the sewing machine to sew the compressed thin area with the surface cover element, thereby producing a sewn trim cover having a compressed thin end region therein; and thereafter sewing the wadding cover with such sewn trim cover in correspondence with the compressed thin end region. As such, a trim cover assembly having the thick foam wadding is easily formed by the conventional sewing machine.

8 Claims, 3 Drawing Sheets

(51) Int. Cl.
  *B68G 7/05*    (2006.01)
  *D05B 11/00*   (2006.01)
  *B60N 2/48*    (2006.01)
  *B60N 2/70*    (2006.01)

(52) U.S. Cl.
  CPC ............... *B68G 7/05* (2013.01); *D05B 11/00* (2013.01); *Y10T 29/481* (2015.01)

(58) Field of Classification Search
  USPC .................. 297/452.38, 218.2, 391, 220
  See application file for complete search history.

(56) References Cited

U.S. PATENT DOCUMENTS

| | | | | |
|---|---|---|---|---|
| 4,408,797 | A * | 10/1983 | Franck et al. | 297/218.2 |
| 6,076,888 | A * | 6/2000 | Turletti | 297/218.3 |
| 6,177,155 | B1 * | 1/2001 | Kurosaki | 428/31 |
| 6,505,570 | B1 | 1/2003 | Sakamoto | 112/470.27 |
| 6,588,838 | B1 * | 7/2003 | Dick et al. | 297/216.13 |
| 6,726,278 | B1 * | 4/2004 | Albright et al. | 297/218.1 |
| 7,673,939 | B2 * | 3/2010 | Taguchi et al. | 297/218.1 |
| 7,837,263 | B2 * | 11/2010 | Booth et al. | 297/218.1 |
| 2001/0018883 | A1 | 9/2001 | Iida | 112/475.08 |
| 2002/0024243 | A1 * | 2/2002 | Peterson | 297/218.2 |
| 2007/0096519 | A1 * | 5/2007 | Conforti | 297/218.2 |
| 2011/0049948 | A1 * | 3/2011 | Hobl et al. | 297/218.2 |
| 2013/0099549 | A1 * | 4/2013 | Tanaka | B60N 2/5825 297/452.38 |

FOREIGN PATENT DOCUMENTS

| | | |
|---|---|---|
| EP | 2703211 A1 | 3/2014 |
| JP | 63-35314 | 2/1988 |

* cited by examiner

TRIM COVER ASSEMBLY AND SEWING METHOD FOR FORMING SAME

BACKGROUND OF THE INVENTION

1. Field of the Invention

The present invention relates to a trim cover assembly for use with a vehicle-seat-related product including a vehicle seat and a headrest, the trim cover assembly having a highly soft cushion portion (a thick foam wadding layer) for receiving a body portion of a user or seat occupant, thereby providing an improved touch and comfort to the user or seat occupant. In the case of a headrest for instance, the trim cover assembly as applied to the headrest is provided with a highly soft cushion portion (a thick foam wadding layer) for receiving a head of a user. Also, the present invention relates to a sewing method for forming such sort of trim cover assembly by use of a sewing machine.

2. Description of Prior Art

Most of hitherto ordinary trim cover assemblies used for vehicle seats, headrests and so forth is of a three-layer lamination structure comprising: a surface cover material; a foam wadding; and a wadding cover, in this order, which is for example disclosed from the Japanese Laid-Open Patent Publication 63-35314 (JP 63-35314 A). Namely, the surface cover material, which faces exteriorly of the trim cover assembly, may be formed from a textile fabric, a synthetic leather or the like. The foam wadding is bonded at one surface thereof to a reverse side of that surface cover material in an integral manner, as by fusing. And the wadding cover, which may be made of a film of synthetic resin, an unwoven cloth material or the like, is bonded to another surface of the foam wadding, opposite to the foregoing one surface of the foam wadding bonded to the surface cover element. In general, a thickness of this trim cover assembly of three-layer lamination structure is not more than 10 mm.

In a practical process for forming a vehicle seat or a headrest, a desired configuration of trim cover assembly sized to cover the seat or headrest is formed by providing a plurality of cover materials of the aforementioned three-layer lamination structure, wherein the cover materials have been obtained by cutting one piece of base cover material of the same three-layer lamination structure into a required number of cover materials in advance, and then sewing together such plurality of cover materials, while aligning the corresponding ends of them with each one another. In that way, a desired configuration of trim cover assembly is formed. Finally, such trim cover assembly is affixed substantially on an entire surface of a foam padding provided on an internal frame of a vehicle seat or a headrest, so that a resultant vehicle seat or headrest is obtained.

Recently, with regard to a headrest for example, it has been desired that a portion of the headrest, on which a head of seat occupant or user is to be contacted, should be increased in softness and pliability to provide a highly improved soft touch of the headrest in order to give an optimal comfort to the user's head. For that purpose, in recent years, a trim cover assembly of an extremely soft property, or what can be described as "ultra soft trim cover assembly", has been required in the field of vehicle-seat-related products including vehicle seats and headrests.

In order to obtain such extremely soft trim cover assembly, it has been found that one unitary piece of elastic foam material, or one piece of slab urethane foam, which is extraordinarily large in thickness relative to a usual thickness of the slab urethane foam found in the vehicle seat related field, is employed and simply incorporated in a conventional trim cover assembly. A required thickness of such extremely thick slab urethane foam is 30 mm, for instance. With this construction, the trim cover assembly is provided with a highly increased softness. In the case of a headrest covered with that extremely soft trim cover assembly, a far-improved comfort and soft touch are given to a head of a user.

However, in a practical process of forming such extremely thick trim cover assembly, it has been found impossible to use an ordinary sewing machine to sew together the afore-said great thickness (30 mm) of slab urethane foam (or thick foam wadding) and the previously-stated three layers, i.e. the surface cover material, the foam wadding and the wadding cover. That is, prior to sewing processes using the sewing machine, the slab urethane foam material having a thickness of as great as 30 mm is sandwiched between the foam wadding and the wadding cover, which results in a total thickness of those four juxtaposed layers being over 30 mm. According to the ordinary sewing machine used for production of vehicle seat and headrest, the pressure foot member of that sewing machine can be raised up to the order of 20 mm as an upper limit and can never be lifted above such 20 mm level. Therefore, the foregoing four juxtaposed layers of over 30 mm can not be placed under such ordinary pressure foot member of the sewing machine, thus making it practically impossible to use the sewing machine to sew the four layers together.

SUMMARY OF THE INVENTION

In view of the afore-stated drawbacks, it is a first purpose of the present invention to provide a trim cover assembly which contains a thick foam wadding therein to provide an improved touch and conform to a user.

In order to achieve such purpose, a trim cover assembly in accordance with the present invention is basically comprised of:
- a surface cover element composed of a surface cover material and a first foam wadding;
- a wadding cover;
- a second thick foam wadding which is greater in pliability and thickness than the first foam wadding, the second thick foam wadding having a compressed thin end region;
- the compressed thin end region being formed by pressing and collapsing an end surface of the second thick foam wadding;
- the second thick foam wadding being interposed between the first foam wadding and the wadding cover, and
- wherein the surface cover element, the compressed thin end region of the second thick foam wadding and the wadding cover are sewn together.

Accordingly, since the compressed thin end region of the second thick foam wadding is sewn with both surface cover element and wadding cover, a main area of the trim cover assembly, excepting the thin end region, remains great in thickness, thus providing a highly improved touch and comfort to a user.

The trim cover assembly is adapted for use on a vehicle-seat-related product including a vehicle seat and a headrest to be mounted on the vehicle seat.

It is also a second purpose of the present invention to provide a sewing method for forming the afore-said trim cover assembly having the thick foam wadding.

To achieve such purpose, in accordance with the present invention, there is provided a sewing method which basically comprises the steps of:

providing a surface cover element composed of a surface cover material and a first foam wadding, the surface cover element having an end portion, providing a wadding cover having an end portion, providing a second thick foam wadding which is greater in pliability and thickness than the first foam wadding, the second thick foam wadding having an end portion and an end surface defined in a distal end of the end portion, setting the surface cover element at a sewing machine, such that the first foam wadding thereof lies down thereat, with the surface cover material thereof laying atop the first foam wadding, stacking the second thick foam wadding upon the surface cover material of the surface cover element set at the sewing machine, pressing and collapsing the end surface of the second thick foam wadding in a downwardly slantwise direction, thereby creating a compressed thin area therein, operating the sewing machine, while continuing to create the compressed thin area, so as to sew together all the end portions respectively of the surface cover element and the second thick foam wadding at the compressed thin area, thereby forming a first sewn portion in and along the all end portions, thereafter, stacking the wadding cover upon the second thick foam wadding, such that the end portion of the wadding cover overlies the first sewn portion, and thereafter, operating the sewing machine to sew the end portion of the wadding cover with all the end portions respectively of the surface cover element and the second thick foam wadding, in and along the first sewn portion, so that a trim cover assembly is formed, which has: a thick portion defined at a point substantially corresponding to the second thick foam wadding; and a thin peripheral end portion defined at a point substantially corresponding to the first sewn portion.

Accordingly, owing to the step of pressing and collapsing the end surface of the second thick foam wadding in the downwardly slantwise direction, the afore-said compressed thin area is created, which allows direct access thereto of a pressure foot element of a conventional sewing machine, thus making it possible to easily sew together the end portions respective of the surface cover element and second thick foam wadding at that compressed thin area by use of the conventional sewing machine. This allows continued operation of the sewing machine, while creating such compressed thin area, to form the first sewn portion in and along the afore-said all end portions. Subsequent to such preliminary sewing step, after stacking the wadding cover on the second thick foam wadding, a thin end area is defined at a local area of the wadding cover corresponding to the first sewn portion, and such thin end area also allows direct access thereto of the pressure foot element of the conventional sewing machine, so that it is possible to easily sew the wadding cover with the surface cover element and second thick foam wadding by the sewing machine. Hence, the trim cover assembly is formed, which has the thick portion and the thin peripheral end portion, as stated above.

As one aspect of the present invention, in the aforementioned steps, there may be further proved the steps of providing at least one another trim cove assembly having a peripheral end portion, and operating the sewing machine to sew the peripheral end portion of such at least one another trim cover assembly with and along the thin peripheral end portion of the afore-said trim cover assembly, so that a predetermined configuration of trim cover assembly is formed.

As another aspect of the invention, at the step of pressing and collapsing the end surface of the second thick foam wadding in the downwardly slantwise direction, a pressure element may be used to press and collapse the end surface of the second thick foam wadding in the downwardly slant wise direction, or a worker may use his or her hand (s) to press and collapse the end surface of the second thick foam wadding in the downwardly slant wise direction.

Other various features and advantages will become apparent from reading of the description, hereinafter, with reference to the accompanied drawings.

DETAILED DESCRIPTION OF PREFERRED EMBODIMENT OF THE INVENTION

As previously stated, in accordance with the present invention, an extremely soft trim cover assembly which contains an extremely great thickness (e.g. 30-mm thickness) of foam wadding (slab urethane foam material) is used for covering a vehicle-seat-related product, such as a vehicle seat or a headrest for use with the vehicle seat, for improvement of its support touch and comfort to a user or seat occupant. For the sake of simplicity, a description hereinafter will only be made of the case where such trim cover assembly is applied to a headrest for use with a vehicle seat, and also a description will be given as to a sewing method for forming the headrest trim cover assembly per se, prior to its being affixed on a body of the headrest.

Figure 1:
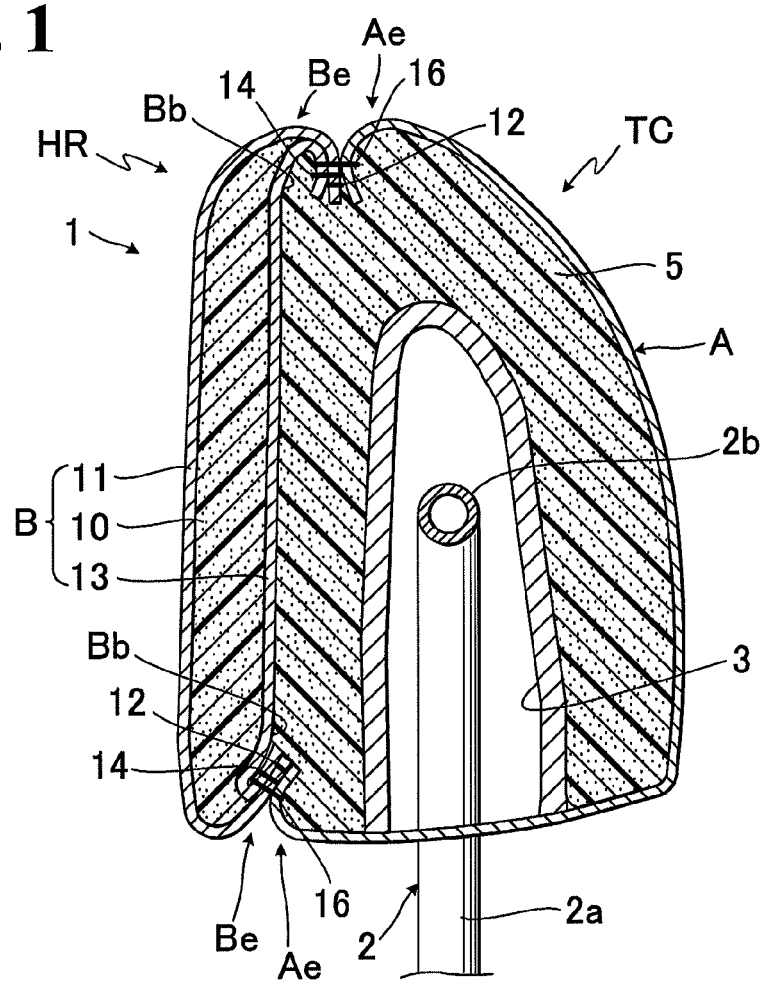
FIG. 1 is a sectional view showing one exemplary mode wherein a trim cover assembly formed by a sewing method of the present invention is applied to a headrest, for instance.

FIG. 1 is a sectional view showing a headrest HR for use with a vehicle seat, wherein a trim cover assembly TC covering the headrest includes an extremely soft trim cover assembly of the aforementioned type, which is designated by B and will be described later. The headrest HR is comprised of a headrest body 1 and a headrest stay 2 extending downwardly from the underside of the headrest body 1. As is known, the headrest stay 2 may be removably mounted in a top of a seat back of a vehicle seat and also be movable vertically relative to the top of the seat back for adjustment in height of the headrest body 1 to a desired level for supporting a head of a user or seat occupant.

While not shown clearly, as known in the art, the headrest stay 2 is so formed to have: a pair of vertical portions 2a and 2a adapted to be inserted in two holes formed in the top of the seat back, respectively; and a transverse portion 2b extended between the two vertical portions 2a and 2a. Designation 3 denotes an internal frame made of a rigid material such as a synthetic resin, the internal frame being provided in the headrest HR. As seen in FIG. 1, disposed in the internal frame 3 are the afore-said transverse portion 2b and vertical portions 2a of the headrest stay 2. Though not shown, a headrest inclination adjustment mechanism is also provided in the internal frame 3 so as to operatively connect the internal frame 3 and the headrest stay 2. Thus, the headrest body 1 can be adjustingly inclined forwardly and rearwardly relative to the headrest stay 2.

As shown in FIG. 1, the headrest HR further includes a foam padding 5 which substantially encloses the outer surfaces of the internal frame 3. As known in the art, the foam padding 5 has a certain stiffness, while being of a required pliability and elasticity, to serve as an ordinary cushion means for providing a relatively great repulsive force to absorb and lessen an impact of load given to a head of a user or seat occupant.

In accordance with the present invention, a headrest trim cover assembly, as generally designated by TC, is attached on and covers substantially a whole of the afore-said foam padding 5. The headrest trim cover assembly TC is depicted in FIG. 1 as comprising: a first trim cover assembly A of a known ordinary three-layer lamination structure to be stated later, which is situated on a rearwardly facing side of the headrest HR; and a second trim cover assembly B of an extremely soft property situated on a forwardly facing side of the headrest HR, upon which a head of a user or seat occupant (not shown) is to be contacted. In the present invention, such second trim cover assembly B has, contained therein, the previously-described thick foam wadding (i.e. slab urethane foam having a great thickness of 30 mm, for instance), as designated by 10, for the purpose of giving a highly-improved soft touch and comfort to the head of user or seat occupant.

In this context, in brief, the first and second trim cover assemblies A and B are sewn with each other in an appropriate manner to form a three-dimensional configuration of headrest trim cover assembly (at TC) which conforms to an outer contour of the headrest H. Then, the internal frame 3, in which the headrest stay 2 and headrest inclination mechanism have been provided, is placed in that headrest trim cover assembly TC, after which, a liquid foaming agent is injected in the trim cover assembly and cured, so that a resultant headrest HR is formed, as can be seen in FIG. 1.

Figure 4:
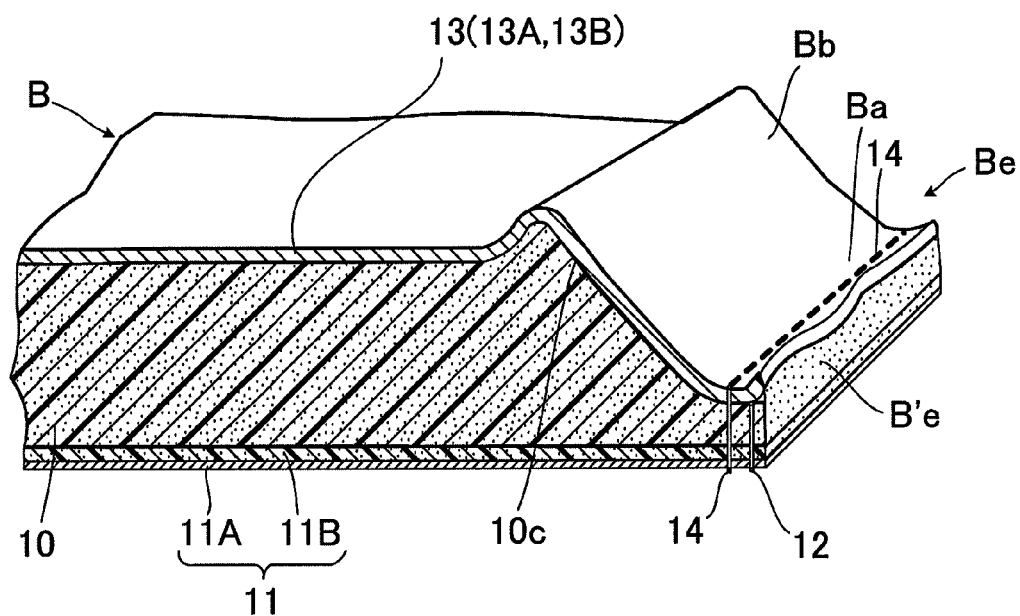
FIG. 4 is a partly broken perspective view showing a first stage of main sewing steps, wherein it is observed that a wadding cover is sewn with the foregoing incomplete unit of trim cover assembly, so that a resultant trim cover assembly is formed.

As best shown in FIG. 4, the second trim cover assembly B comprises: a surface cover material 11A made of a known textile fabric or synthetic leather; a first foam wadding 11B of a known ordinary type having a small thickness, which is bonded by fusing to a reverse side of the surface cover material 11A in an integral manner, wherein such lamination of the surface cover material 11A and first foam wadding 11B constitutes a surface cover element 11 having a total thickness of not more than 10 mm; a wadding cover 13; and a second thick foam wadding 10 sandwiched between the first foam wadding 11B and the wadding cover 13, wherein the second thick foam wadding 10 is greater in pliability and thickness than the first foam wadding 11B.

In this regard, as will be specifically described later, during sewing steps for forming this second trim cover assembly B, an end surface 10b of the second thick foam wadding 10 is first forcibly collapsed into a compressed thin end region, and then the thus-compressed thin end region of that second thick foam wadding 10 is sewn with an end region of the surface cover element 11. Hence, after that sewing, only the sewn connection portion between the second thick foam wadding 10 and the surface cover element 11 is made extremely thin, which means that all subsequent sewing steps can be effected there with much ease, while other area of the second trim cover assembly B than such sewn thin portion maintains its great thickness of over 30 mm. That is, in the present invention, an extremely thick foam wadding having a great thickness of 30 mm or so can be easily used in the trim cover assembly to provide a highly improved soft touch and comfort to a user or seat occupant.

Now, a specific description will be made of a sewing method for forming the above-described second trim cover assembly B. In the present invention, the sewing method is characterized by comprising preliminary sewing steps and main sewing steps, as follows.

1. Preliminary Sewing Steps

Figure 2:
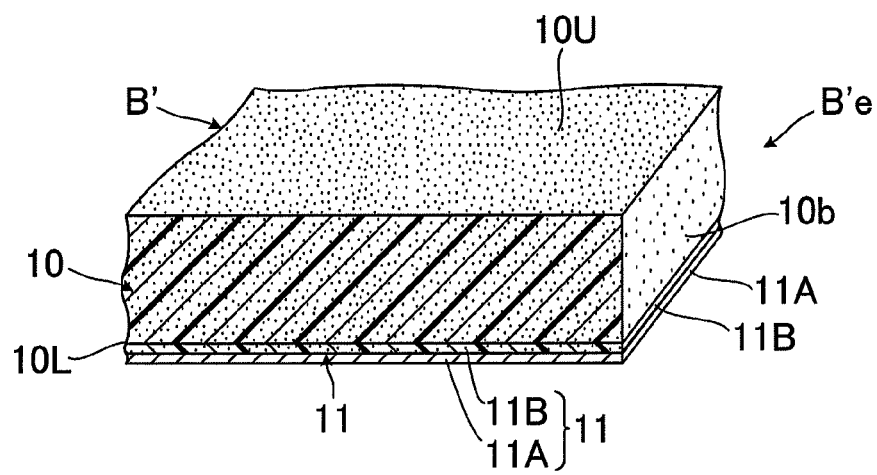
FIG. 2 is a partly broken perspective view showing a state where a second thick foam wadding is stacked on a surface cover element at an initial stage of preliminary sewing steps in accordance with the present invention.

As indicated in FIG. 2, first of all, an incomplete unit of second thick trim cover assembly, as generally designated by B', is provided. This incomplete trim cover assembly unit B' will become a resultant second thick trim cover assembly B that has been explained above, at a subsequent main sewing steps to be described later.

In this context, such resultant second thick trim cover assembly B per se has to be formed by sewing together three different constituent materials, i.e. the surface cover element 11, a second thick foam wadding 10 and a wading cover 13, thus presenting an extremely thick layer (over 30 mm) that can not be set in position for sewing by an ordinary conventional sewing machine whose pressure foot member can be raised up to 20 mm as an upper limit, as stated earlier.

In order to allow such extraordinary thick lamination structure to be easily set under the pressure foot member of the conventional sewing machine, what should be initially done in accordance with the present invention is a preliminary sewing operation which involves the steps of collapsing and compressing an end surface of the second thick foam padding 10 locally in a downwardly slantwise direction, and sewing the thus-compressed end surface region of the second thick foam padding 10 with a peripheral end portion of the surface cover element 11.

A specific description of such preliminary sewing steps will be described hereinafter.

First of all, referring again to FIG. 2, formation of the incomplete unit of second thick trim cover assembly B' will now be described. One predetermined preformed piece of the surface cover material 11A (made of a known woven fabric or synthetic leather) is provided, and then one predetermined preformed piece of the first foam wadding 11B, equal in size to that surface cover material 11A, is bonded to a reverse side of that surface cover material 11B integrally by fusing. At this point; a care is taken to insure that all the distal ends of those two materials 11A and 11B are aligned with each other. Consequently, there is obtained one piece of surface cover element 11 consisting of lamination of the surface cover material 11A and first foam wadding 11B, as can be observed in FIG. 2, wherein a thickness of such, surface cover element 11 is not more than 10 mm.

Next, one predetermined preformed piece of second thick foam wadding 10 is provided, which is equal in length and width to the foregoing one piece of surface cover element 11. This second thick foam wadding 10 is a slab urethane foam having a great thickness of 30 mm, as explained earlier. As can be understood from FIG. 2, the second thick foam wadding 10 is laid upon the first foam wadding layer 11B of the surface cover element 11. In other words, the bottom surface 10L of the second thick foam wadding 10 is placed on the outer surface of the first foam wadding 11B of the surface cover element 11, while insuring that all the peripheral ends of the thus-juxtaposed second thick foam wadding 10 and surface cover element 11 are aligned with one another, as understandable from FIG. 2 wherein it is seen that a vertically extending end surface 10b of the second thick foam wadding 10 is in registry with the distal end of the surface cover element 11. Thus, there is obtained an incomplete unit of thick trim cover assembly B' which is over 30 mm in thickness.

Figure 3A:
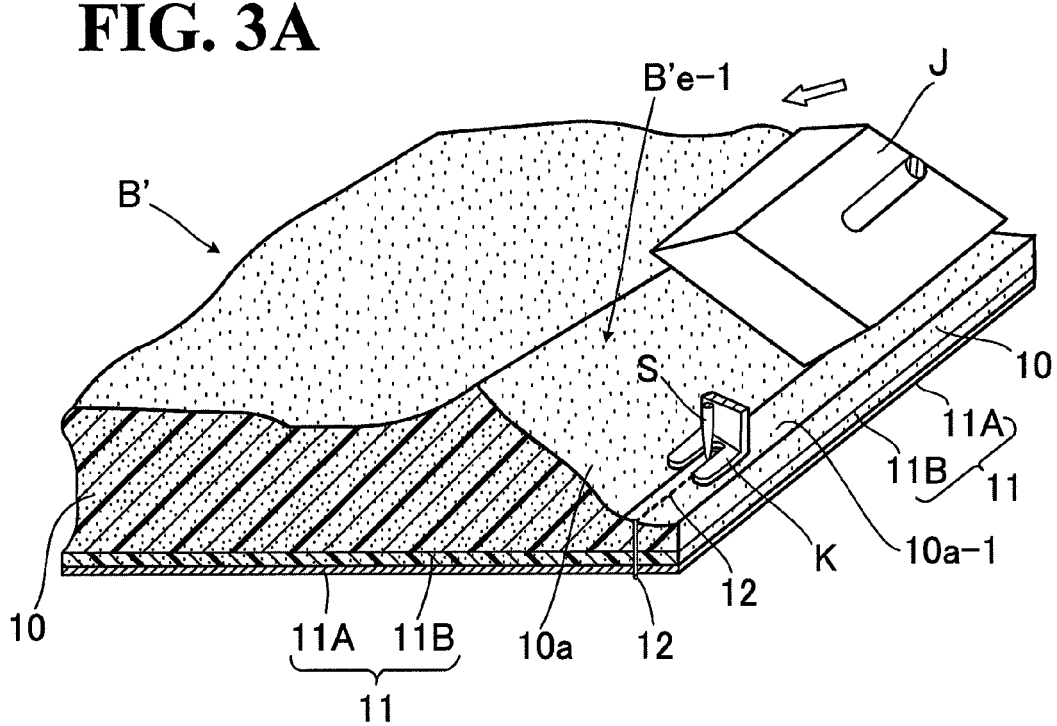
FIG. 3A is a partly broken perspective view showing a second stage of the preliminary sewing steps, wherein it is observed that a surface end of the second thick foam wadding is collapsed locally by a pressure element, for example, into a thin area therein, and a sewing is effected in and along such thin area.

Such incomplete unit of thick trim cover assembly B' is placed on a table of sewing machine (not shown) in order to carry out the preliminary sewing at this stage. As seen in FIG. 3A, a conventional sewing machine used in the present invention is provided with a sewing needle S and a pressure foot member K, all of which are known in the art. As noted earlier, the pressure foot member K in this conventional sewing machine can be raised up to 20 mm as an upper limit. Since the incomplete unit of thick trim cover assembly B' has more than 30-mm thickness on the other hand, it is practically impossible to raise the pressure foot member K to a level above such extremely thick trim cover assembly B'.

In accordance with the present invention, as shown in FIG. 3A, a pressure element J may be provided, which is adapted for pressing and collapsing a localized area of end surface 10b of the second thick foam wadding 10 in the peripheral end portion B'e of the incomplete trim cove assembly B'. Now, the pressure element J is positioned angularly relative to the vertically extending end surface 10b of the second thick foam wadding 10 or relative to the vertically extending end surface B'e of the incomplete trim cover assembly B', at a predetermined angle of inclination with respect thereto. Then, as indicated by the arrow in FIG. 3A, the pressure element J is moved downwardly by the predetermined angle of inclination (i.e. in downwardly slantwise direction) and pressed against a given localized area of the vertical end surface 10b of the second thick foam wadding 10, so that the corresponding localized area of that vertical end surface 10b is resiliently collapsed and compressed as shown in FIG. 3A. Consequently, a certain area of the end surface 10b adjacently surrounding the thus-compressed area thereof is also resiliently deformed and compressed, thereby temporarily defining a compressed thin end region 10a in the second thick foam wadding 10, wherein such compressed thin end region 10a has a thickness of about 10 to 15 mm or so. Due to this pressing operation, in the end surface B'e of the incomplete trim cover assembly B', there is temporarily defined another compressed thin end region B'e-1 which provides a sloped low surface which is not more than 20 mm in height from the bottom side (at 11) of the incomplete cover assembly B' or from the table (not shown) of the sewing machine.

Accordingly, by means of the pressure element J, a compressed thin area (at 10a and B'e-1), not more than 20 mm in thickness, is temporarily defined in the end surface B'e of the incomplete trim cover assembly B', which in effect allows the conventional pressure foot element K and sewing needle S to be directly positioned in that compressed thin area, as can be seen in FIG. 3A.

In this connection, instead of using the pressure element J, a worker may use his or her hands (or fingers) to collapse and compress a given localized area of the end surface B'e of the incomplete trim cover assembly B' into a temporarily compressed thin area substantially identical to the afore-said thin area indicated by 10a and B'e-1 in FIG. 3A, so that the conventional pressure foot member K can be directly positioned in that compressed area and thus set at the operative position thereof.

Then, as understandable from FIG. 3A, the pressure foot element K with the sewing needle S is brought into the afore-said temporarily compressed thin areas 10a and B'e-1 in the incomplete trim cover assembly B' and pressed thereagainst in the afore-said downwardly slantwise direction, such that a sewing allowance is given there, as indicated by 10a-1, with respect to the distal end of the incomplete trim cover assembly B'. At this step, upon operating the sewing machine, a sewing is proceeded along such sewing allowance 10a-1 to sewn together both two peripheral end portions respectively of the surface cover element 11 and second thick foam wadding 10, with both pressure foot element K and pressure element J being maintained at their respective operative positions. In other words, during the sewing, the pressure element J is maintained in the state of collapsing and compressing the vertically extending end surface 10b of the second thick foam wadding 10 (or the vertically extending end surface B'e of the incomplete trim cover assembly B') by a predetermined angle of inclination with respect thereto, while the pressure foot element K maintained in the state of further pressing the thus-compressed thin area (at 10a and B'e-1) at the same time. Hence, it is to be seen that the end surface 10b of the second thick foam wadding 10 continues to be locally collapsed and compressed by the pressure element J over the whole length thereof, whereupon it is to be seen that the afore-said temporarily collapsed thin area (at 10a and B'e-1) continues to be created ahead of the already sewn region (at 12) as well as adjacent to one lateral wall of the pressure element J that faces the pressure foot element K, as can be understood from FIG. 3A. Therefore, once the sewing operation starts, there is no need to raise the pressure foot element K until the completion of sewing, and the sewing can be effected continuedly, with both pressure foot element K and pressure element J being maintained at their respective operative positions as stated above.

While not shown, the above effects will also hold true for the, case where a worker uses his or her hands or fingers to collapse and compress the end surface 10b of the second thick foam wadding 10 locally, instead of the pressure element J. In that case, while operating the sewing machine, the worker must continue collapsing and compressing such end surface 10b locally, with his or her finger(s), so that an appropriate compressed thin area, corresponding to the afore-said compressed thin area (at 10a and B'e-1), continues to be created ahead of an already sewn region (as at 12 in FIG. 3A) as well as adjacent to his or her finger that faces the pressure foot element K.

Figure 3B:
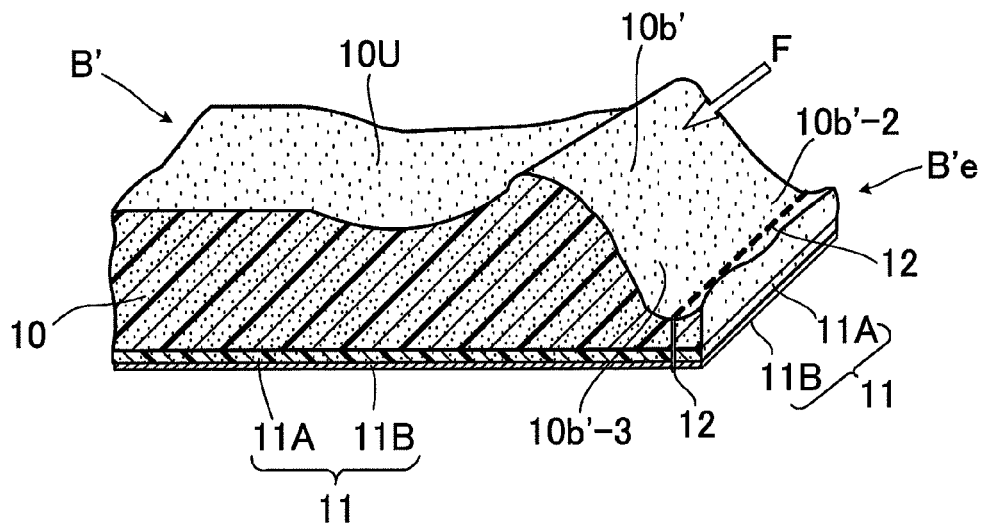
FIG. 3B is a partly broken perspective view showing an incomplete unit of trim cover assembly formed at the preliminary sewing steps.

As a result of the above-described preliminary sewing operation, although not clearly shown, it is to be understood from FIG. 3B that all the peripheral end portions of the surface cover element 11 and second thick foam wadding 10 are sewn together via a thread (at 12). This sewn portion shall be referred to as a first sewn portion 12, hereinafter.

As indicated in FIG. 3B, owing to the preliminary sewing, it is to be understood that the first sewn portion 12 is formed in and along all the peripheral end portions B'e of the incomplete trim cove assembly B', which results in a low flat region 10b'-2 being defined in all the peripheral end portions 10b' of the second thick foam wadding 10. Such low flat region 10b'-2 is the order of nearly 10 mm in height from the bottom side (at 11) of the trim cover assembly B' or from the table (not shown) of sewing machine. At this point, though not shown, it is to be understood that the temporarily compressed end surface area (at 10a and B'e-1 in FIG. 3A) of the second thick foam wadding 10 immediately, substantially recovers its original vertically-extending end surface, as indicated by 10b' in FIG. 2, due to the resilient property thereof. That is, after the preliminary sewing has been done, the temporarily compressed end surface area (at 10a and B'e-1) resiliently recovers its original vertically-extending surface substantially, thus becoming a substantially vertical end surface 10b', as shown in FIG. 3B, which is nearly 30 mm in thickness or height, excepting the low flat region 10b'-2.

2. Main Sewing Steps

First of all, the previously-stated one preformed piece of wadding cover 13 (see FIG. 4) is now provided. In brief, at the present stage of main sewing steps, the wadding cover 13 is stacked on and sewn with the incomplete unit of second trim cover assembly B' to which the above-described preliminary sewing has been effected, in order to form a resultant second trim cover assembly B. Now, a description will be made of the main sewing steps hereinafter.

Figure 5:
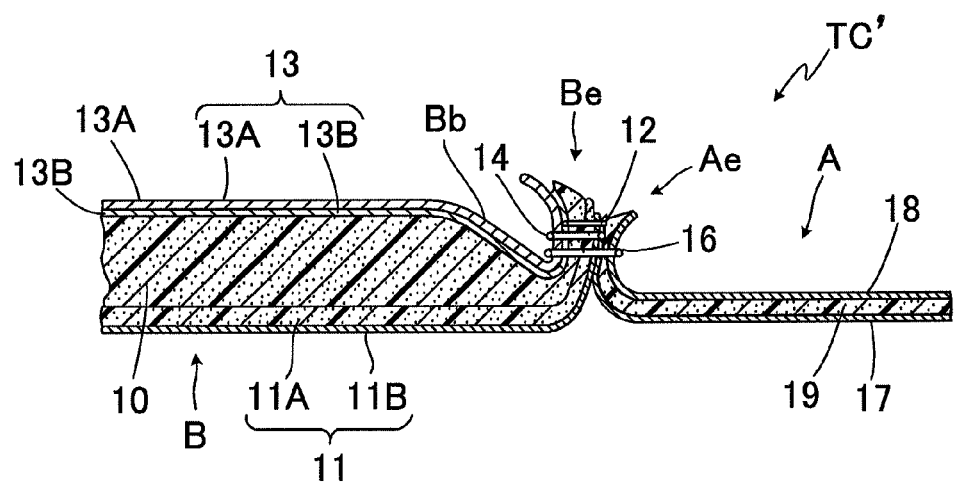
FIG. 5 is a sectional view showing a state where the resultant trim cover assembly is sewn with another trim cover assembly.

In this context, the wadding cover 13 itself may be one layer of an unwoven fabric material 13A, but in most case, it should preferably be of a two-layer lamination structure comprising that unwoven fabric material 13A and a film material 13B attached to a reverse side of the unwoven fabric material 13A, as best seen from both FIGS. 3B and 5. For, provision of the film material 13B prevents leakage of a liquid foaming agent through the unwoven fabric material 13A into the second trim cover assembly B during a foaming process, as is known, the details of which is omitted since it is not the subject matter of the present invention.

At first, this wadding cover 13 is brought downwardly towards the upper surface 10U (see FIG. 3B) of the second thick foam wadding 10 of the incomplete unit of second trim cover assembly B' to which the preliminary sewing has been effected. Then, thought not shown, after the wadding cover 13 has been placed upon that upper surface 10U of second trim cover assembly B', the distal end of the wadding cover 13 is aligned with the distal end of the compressed thin peripheral end portion B'e (which can be seen in FIG. 3B) of the second trim cover assembly B'. At this point, using his or her fingers, a worker should urge a given localized area of the peripheral end portion of the wadding cover 13 into contact upon the compressed thin peripheral end portion B'e as well as upon the vertically extending end surface 10b' of the second thick foam wadding 10. As such, the peripheral end portion of the wadding cover 13 is set and retained immovably at a position for sewing with the compressed thin peripheral end B'e. In this regard, it is important to note that the peripheral end portion of the wadding cover 13 must be sewn with the peripheral end portion B'e along a sewing line more inwardly of the second trim cover assembly B' than the first sewn portion 12, which can be understood from the designation 14 in FIG. 4.

Here, it is to be appreciated that the compressed thin peripheral end portion B'e not only provides an extremely low horizontal area 10b'-2 (which is the order of nearly 10 mm in thickness or height), but also provides an inwardly recessed vertical area 10b'-3 in the vertically extending end surface 10b' of the second thick foam wadding 10, wherein the vertically extending end surface 10'b, as stated above, has again had its original thickness or height of about 30 mm. This can be roughly understood from FIG. 3B. It is to be appreciated that those low horizontal area 10b'-2 and inwardly recessed vertical areas 10b'-3 provide a space sufficient to allow direct access therethrough of both pressure foot element K and sewing needle S to the compressed thin peripheral end portion B'e.

Therefore, after the peripheral end portion of the wadding cover 13 has been locally stacked and retained by the worker's hands or fingers upon the compressed thin peripheral end portion B'e in the manner stated above, thanks to the afore-said space provided by the two areas 10'b-2 and 10'b-3, the pressure foot element K with the sewing needle S is easily and directly pressed against a local region of the wadding cover 13 which lies astride the thin peripheral end portion B'e and the vertically extending end surface 10b'. And as a result thereof, the peripheral end portion B'e is further compressed resiliently downwards, while the end surface 10b' resiliently compressed horizontally in a direction more inwardly of the trim cover assembly B' from the first sewn potion 12 as indicated by the arrow F in FIG. 3B, thereby providing a second sewing area there, in which the peripheral end portion of the wadding cover 13 is to be sewn with the compressed thin peripheral end portion B'e along a sewing line more inwardly than the first sewn portion 12. During sewing operation, in brief, such second sewing area will be created automatically by the pressure foot element K along that peripheral end portion B'e, while simultaneously both peripheral end portions of the wadding cover 13 and peripheral end portion B'e be moved in the sewing direction relative to the stationary pressure foot element K in a sliding contact therewith, to thereby form a second sewn portion 14 (see FIG. 4)

Now, specifically sated, upon the second sewing area having been created as stated above, the sewing machine is then operated, while keeping the pressure foot element K thereof to be pressed against a local region of that wadding cover 13 which lies astride the compressed thin peripheral end portion B'e and the vertically extending end surface 10b', although not shown. Under such state, the end portion of the wadding cover 13 is smoothly sewn with and along the peripheral end portion B'e, such that the afore-said local region of wadding cover 13 that lies astride the end portion B'e and end surface 10b' is smoothly moved in the sewing direction relative to the stationary pressure foot element K in a sliding contact therewith, although not shown.

As a result of this main sewing operation, as shown in FIG. 4, a resultant second trim cover assembly designated by B is formed, which is provided with a thin peripheral end portion designated by Be. In this regard, although not clearly shown, it is to be understood from the FIG. 4 in conjunction with FIG. 1 that a whole main body area of that resultant trim cover assembly B, surrounded by the thin peripheral end portion Be, maintains its original great thickness of 30 mm.

In this resultant second rim cover assembly B, the peripheral end portion of the wadding cover 13 is sewn with and along the first compressed thin peripheral end portion Be', thus defining the second thin peripheral end portion Be, whereupon a second sewn portion 14 is formed in and along that particular second peripheral end portion Be and situated more inwardly of the trim cover assembly B than the first sewn portion 12.

Notably here, as seen in FIG. 4, an extremely low region Ba is defined in the second peripheral end portion Be so as to cover the second sewn portion 14 and also cover a local area adjacent to that second sewn portion 14, excluding a downwardly-sloped thin end surface region Bb which will be stated below.

Further, now that a whole of the peripheral end portion of the wadding cover 13 is sewn with a whole of the thin peripheral end portion Be at and along the second sewn portion 14, an entire area of the warding cover 13 is made small correspondingly and therefore all the peripheral end portions of that wadding cover 13 are forcibly stretched outwardly in a direction from the center of the wadding cover 13 towards all the peripheral end portions Be with respect to the second thick foam wadding 10. Due to this stretched state, although not clearly shown, but as can be understood from FIG. 4 in conjunction with FIG. 1, all the end surface portions of the second thick foam wadding 10 are resiliently compressed to become sloped end surface portions as indicated by 10c in FIG. 4, whereupon a downwardly-sloped thin end surface region Bb is defined in the resultant second trim cover assembly B at and along all the peripheral end portions Be thereof.

As previously stated, as far as the present embodiment is concerned, the second trim cover assembly B is to constitute a forwardly facing portion of a resultant headrest trim cover assembly TC, as can be seen in FIG. 1, and should preferably be in the order of more than 10 to 30 mm in thickness with a view to achieving a desired softness and comfort to a head of user which is to contact that second trim cover assembly B.

Next, a predetermined preformed piece of another trim cover assembly (see FIG. 5) is provided, which shall be referred to as "a first trim cover assembly A" hereinafter. This first trim cover assembly A is of a known three-layer lamination structure comprising a surface cover material 17, a wadding cover 18, and a thin foam wadding 19 sandwiched between the surface cover material 17 and wadding cover 18. Such conventional trim cover assembly A is in the order of not more than 10 mm in thickness.

As understandable from FIGS. 1 and 5, the first trim cover assembly A has peripheral end portions Ae and is to constitute a rearwardly facing portion of the resultant headrest trim cover assembly TC.

Although not shown, the first trim cover assembly A is first placed upon the table of the sewing machine having the afore-said pressure foot element K and sewing needle S, so that the wadding cover layer 18 thereof contacts that table. And thereafter, the second trim cover assembly B is stacked on and lies atop that first trim cover assembly A, such that the surface cover layer 11 of the second trim cover assembly B contacts the surface cover layer 17 of the first trim cover assembly A, while insuring that all the peripheral end portions Ae of the first trim cover assembly A are aligned with all the compressed thin peripheral end portions Be of the second trim cover assembly B.

At this point, owing to the afore-said extremely low region Ba, the thus-juxtaposed two peripheral end portions Ae and Be respectively of the first and second trim cover assemblies A and B are extremely low in height from the table of sewing machine (i.e. far below 20 mm) at a point corresponding to that extremely low region Ba, which makes it possible to normally raise and set the pressure foot element K of the sewing machine upon the uppermost layer (i.e. the wadding cover 11) of the two juxtaposed peripheral end portions Ae and Be. Further, owing to the afore-said downwardly-sloped thin end surface region Bb, before pressing and setting the pressure foot element K on that uppermost wadding cover 11, those two peripheral end portions Ae and Be can be adjustably moved relative to the pressure foot element K in a sliding contact therewith in a direction more inwardly of the two trim cover assemblies A and B than the second sewing portion 14, so that a new sewing line can be set at a proper location distant from that second sewing portion 14.

In that manner, the pressure foot element K is set on that uppermost wadding cover 11 of the juxtaposed two peripheral end portions Ae and Be at a point substantially corresponding to the extremely low region Ba as well as at a point more inwardly of the two trim cover assemblies A and B than the second sewn portion 14, thereby setting a new sewing line at the present stage. Under that state, the sewing machine is operated to sew together the two peripheral end portions Ae and Be along the new sewing line. During sewing, both two peripheral end portions Ae an Be are smoothly moved slidingly in the sewing direction relative to the stationary pressure foot element K, thereby being sewn together by the sewing needle S, although not shown. This is because the new sewing line is set adjacent to the foot area of the downwardly-sloped thin end surface region Bb, thus providing a low surface that allows smooth relative sliding of the stationary pressure foot element K thereon, so that the end surface region Bb is not caught by the pressure foot element K during sewing. Thus, both two peripheral end portions Ae and Be are smoothly moved past the pressure foot element K in a sliding relation therewith and sewn together by the sewing needle S with much ease:

After the completion of this sewing, as understandable from FIG. 5 in conjunction with FIG. 1, all the peripheral end portions Ae of the first trim cover assembly A are sewn and connected via a thread (at 16) with all the thin peripheral end portions Be of the second trim cover assembly B, whereupon a reversed state of three-dimensional headrest trim cover assembly (as at TC') is formed in a usual manner known in the art, though not clearly shown. In this regard, it is to be seen that a third sewn portion 16 is formed in and along all the two peripheral portions Ae and Be respectively of the first and second trim cover assemblies A and B.

While not shown, as usually done in the art, the reversed state of three-dimensional headrest trim cover assembly (as at TC') is turned over into a normal state of three-dimensional trim cover assembly designated by TC in FIG. 1, after which, a liquid foaming agent is injected and cured in that trim cover assembly TC together with the inner frame 3 and headrest stay 2, so that a foam padding 5 is formed integrally therein. Then, a headrest HR is produced as shown in FIG. 1. It is to be seen that all the first and second sewn portions 12 and 14 are situated inside of the resultant trim cover assembly TC with respect to the third sewn portion 16 and therefore, all those three sewn portions 12, 14 and 16 are invisible from the outside.

Accordingly, in accordance with the present invention, it is to be appreciated that:—

(i) Owing to the preliminary sewing, the thick foam wadding 10 is compressed substantially at and along the first sewn portion 12 to provide the thin or low regions (at 10b'-2 and 10'b-3) there and therearound. It is therefore possible to directly set the conventional pressure foot element K at such low regions (at 10'b-2 and 10'b-3), so that, at the subsequent main sewing steps, the wadding cover 13 can easily be sewn with both surface cover element 11 and thick foam wadding 10 along a sewing line more inwardly than the firs sewn portion 12, thereby forming the second sewn portion 14 there.

(ii) At the main sewing steps, after such sewing of the wadding cover 13, the thick foam wadding 10 is further compressed substantially at and along the second sewn portion 14 to provide the thin or low regions (at Ba and Bb) in the resultant second trim cover assembly B. Hence, at the step of sewing together the first and second trim cover assemblies A and B, a total thickness or height of the juxtaposition of such low regions (at Ba and. Bb) of the second trim cover assembly B and the first trim cover assembly A is still smaller than the upper limit (approx. 20 mm) of the pressure foot element K, so that the conventional pressure foot element K can be directly set at such low regions (at Ba and Bb) of the second trim cover assembly B juxtaposed on the first trim cover assembly A. Therefore, even at this step, it is easily possible to sew the first trim cover assembly A with the second trim cover assembly B.

(iii) In particular, the preliminary sewing steps involve the step of pressing and collapsing the vertical end surface 10*b* of the thick foam wadding 10 in a downwardly slantwise direction thereto, as shown in FIG. 3A, and causing it to be in a temporarily compressed state, thereby forming a temporarily compressed and sloped region (at the location of the pressure element J in FIG. 3A) in that vertical end surface 10*b*. In such downwardly slantwise pressing manner, around the thus-compressed region, there is created a certain thin and sloped area (at 10*a* and B'e-1) in the thick foam wadding 10, which allows direct access thereto of the pressure foot element K. Further, such certain thin and sloped area (at 10*a* and B'e-1) allows smooth relative sliding of the pressure foot element K thereon, so that the pressure foot element K can be maintained at its operative position until the completion of sewing. Hence, a worker can keep on operating the sewing machine to complete sewing the foam wadding 10 and surface cover element 11 together, which therefore facilitates the ease of forming the second trim cover assembly B. It is noted that the thin and sloped area (at 10*a* and B'e-1) can not be created by collapsing and compressing the vertical end surface 10*b* in a vertically downward direction (or downward perpendicular direction) thereto. In the present invention, therefore, a worker is not compelled to operate the conventional annoying operation of sewing machine which requires intermittent stops of the sewing machine in order for the worker to collapse and compress a small localized area of the vertical end surface 10*b* vertically, using his or her fingers, in an attempt to form there a thin area that allows direct access of the pressure foot element K thereto.

(iv) The second trim cover assembly B thus formed is still provided with a low and sloped area (at Ba and Bb) therein. When this second trim cover assembly B is laid on another first trim cover assembly A placed on the table of sewing machine, a sewing portion of those first and second trim cover assemblies A and B, which corresponds to that lower and sloped area (at Ba and Bb), is still of an extremely small thickness or extremely low in height from the table of sewing machine, which is lower than the upper limit of the pressure foot element K of the conventional sewing machine. Therefore, the pressure foot element K can be directly set on that sewing portion of the first and second trim cover assemblies A and B, and a sewing can be easily effected to sew those two trim cover assemblies together, with smooth relative sliding of the pressure foot element K thereon.

While having described the present invention thus far, it is to be understood that the invention is not limited to the illustrated embodiment, but any modification, addition and replacement may be applied thereto, without departing from the scopes of the appended claims. For example, the present invention can be applied to a trim cover assembly associated with a vehicle seat, such as a trim cover assembly of a seat cushion or a trim cover assembly of a seat back.

What is claimed is:

1. A trim cover assembly comprising:
   a) a first cover element including:
      a surface cover element composed of:
         a surface cover material having a first end region; and
         a first foam wadding having a second end region;
      a wadding cover including a main region and an end region;
      a second thick foam wadding which is greater in pliability and thickness than said first foam wadding of said surface cover element;
      said second thick foam wadding being interposed between said first foam wadding and said wadding cover;
      said second thick foam wadding including:
         a main thick region; and
         a compressed end region formed by pressing and collapsing an end surface of the second thick foam wadding, said compressed end region being thereby thinner than said main thick region;
      said first foam wadding residing between said surface cover material and said second thick foam wadding;
      said main region of the wadding cover overlaying said main thick region of said second thick foam wadding; and
      a sewn end portion consisting of:
         a first sewn region defined by sewing said compressed end region of said second thick foam wadding to both said first end region of said surface cover material and said second end region of said first foam wadding, altogether; and
         a second sewn region juxtaposed on and sewn with said first sewn region, said second sewn region being defined by placing said end region of said wadding cover on said compressed end region at said first sewn region and then sewing the end region of the wadding cover to the first sewn region;
   and
   b) a second cover element including an end portion,
      wherein said end portion of said second cover element is sewn with said sewn end portion of said first cover element.

2. The trim cover assembly as claimed in claim 1, wherein said trim cover assembly is adapted for use on a vehicle-seat-related product including a vehicle seat and a headrest to be mounted on said vehicle seat.

3. The trim cover assembly as claimed in claim 1, wherein said sewn end portion of said first cover element is smaller in thickness than said main thick region of the second thick foam wadding to such an extent that said end region of said wadding cover is close to said first end region of said surface cover material.

4. The trim cover assembly as claimed in claim 1, wherein said first sewn region is defined by sewing said compressed end region of said second thick foam wadding to both said first and second end regions respectively of said surface cover material and said first foam wadding, altogether, with said compressed end region being formed by pressing and collapsing said end surface of said second thick foam wadding slantwise in a direction to said surface cover element.

5. A trim cover assembly comprising:
   a surface cover element composed of:
      a surface cover material having a first end region; and
      a first foam wadding having a second end region;

a wadding cover including a main region and an end region;

a second thick foam wadding which is greater in pliability and thickness than said first foam wadding of said surface cover element;

said second thick foam wadding being interposed between said first foam wadding and said wadding cover, said second thick foam wadding including:
  a main thick region; and
  a compressed end region formed by pressing and collapsing an end surface of the second thick foam wadding, said compressed end region being thereby thinner than said main thick region;

said first foam wadding residing between said surface cover material and said second thick foam wadding;

said main region of the wadding cover overlaying said main thick region of said second thick foam wadding; and a sewn end portion consisting of:
  a first sewn region defined by sewing said compressed end region of said second thick foam wadding to both said first end region of said surface cover material and said second end region of said first foam wadding, altogether; and
  a second sewn region juxtaposed on and sewn with said first sewn region, said second sewn region being defined by placing said end region of said wadding cover on said compressed end region at said first sewn region and then sewing the end region of the wadding cover to the first sewn region.

6. The trim cover assembly as claimed in claim 5, wherein said trim cover assembly is adapted for use on a vehicle-seat-related product including a vehicle seat and a headrest to be mounted on said vehicle seat.

7. The trim cover assembly as claimed in claim 5, wherein said first sewn region is defined by sewing said compressed end region of said second thick foam wadding to said first and second end regions respectively of said surface cover material and said first foam wadding, altogether, with said compressed end region being formed by pressing and collapsing said end surface of said second thick foam wadding slantwise in a direction to said surface cover element.

8. The trim cover assembly as claimed in claim 5, wherein said sewn end portion is smaller in thickness than said main thick region of the second thick foam wadding to such an extent that said end region of said wadding cover is close to said first end region of said surface cover material.

* * * * *